United States Patent
Gimpl et al.

(10) Patent No.: US 7,386,698 B2
(45) Date of Patent: Jun. 10, 2008

(54) APPARATUS AND METHOD FOR AUTOMATICALLY DEFINING, DEPLOYING AND MANAGING HARDWARE AND SOFTWARE RESOURCES IN A LOGICALLY-PARTITIONED COMPUTER SYSTEM

(75) Inventors: David Joseph Gimpl, Rochester, MN (US); Kyle Lane Henderson, Mantorville, MN (US); Kent LeDel Hofer, Plainview, MN (US); Cale T. Rath, Byron, MN (US); George James Romano, Rochester, MN (US); Tammy Lynn Van Hove, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 11/128,062

(22) Filed: May 12, 2005

(65) Prior Publication Data

US 2006/0259730 A1 Nov. 16, 2006

(51) Int. Cl.
*G06F 12/00* (2006.01)
(52) U.S. Cl. .................. 711/173; 711/111; 711/154; 711/156; 713/1; 713/2; 713/100; 717/175
(58) Field of Classification Search ............ 713/2, 713/1, 100; 711/173, 111, 154, 156; 717/175
See application file for complete search history.

(56) References Cited

U.S. PATENT DOCUMENTS

| | | | | |
|---|---|---|---|---|
| 5,367,686 A * | 11/1994 | Fisher et al. | | 717/174 |
| 5,819,061 A * | 10/1998 | Glassen et al. | | 718/1 |
| 6,112,301 A * | 8/2000 | Johnson | | 713/1 |
| 6,182,275 B1 * | 1/2001 | Beelitz et al. | | 717/175 |
| 7,036,009 B2 * | 4/2006 | Hiramoto | | 713/100 |
| 7,055,149 B2 * | 5/2006 | Birkholz et al. | | 717/172 |
| 2004/0215917 A1 * | 10/2004 | Lambeth et al. | | 711/206 |
| 2006/0095708 A1 * | 5/2006 | Sater et al. | | 711/172 |

OTHER PUBLICATIONS

Brian R Smith et al., "ISeries e-Business Handbook: A Technology and Product Reference," Mar. 2001, IBM Corporation—International Technical Support Organization, 2nd Edition, pp. 275-276.*

"IBM Redbooks | What is a Hardware Management Console (HMC)?," Oct. 2003, IBM Corporation.*

* cited by examiner

*Primary Examiner*—Stephen C Elmore
(74) *Attorney, Agent, or Firm*—Martin & Associates, LLC; Derek P. Martin

(57) ABSTRACT

A partition wizard allows automatically defining from a set of system requirements a solution profile that defines a combination of hardware and software in multiple logical partitions to satisfy the performance objectives. The solution profile may be used by an order processing system to automatically generate an order for a target computer system. The solution profile may also be used by a hardware management console to automatically create logical partitions on the target computer system, then may be used by an operating system install engine to automatically install a desired operating system in each of the logical partitions on the target computer system and to automatically install desired software into each of the logical partitions in the target computer system. The solution profile may also be used to manage the target computer system.

5 Claims, 9 Drawing Sheets

APPARATUS AND METHOD FOR AUTOMATICALLY DEFINING, DEPLOYING AND MANAGING HARDWARE AND SOFTWARE RESOURCES IN A LOGICALLY-PARTITIONED COMPUTER SYSTEM

BACKGROUND OF THE INVENTION

1. Technical Field

This invention generally relates to data processing, and more specifically relates to the process of defining, deploying and managing resources in a logically partitioned computer system.

2. Background Art

Computer systems typically include a combination of hardware and software. The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. The eServer iSeries computer system developed by IBM is an example of a computer system that supports logical partitioning. If logical partitioning on an eServer iSeries computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Known methods for defining, deploying and managing logically-partitioned computer systems are manual in nature, time-consuming, and error-prone. Without a way to automate the definition, deployment and management of logically-partitioned computer systems, the computer industry will continue to suffer from inefficient manual methods for defining, deploying and managing logically-partitioned computer systems.

DISCLOSURE OF INVENTION

A partition wizard allows automatically defining a solution profile from a set of system requirements. The performance objectives may be generated by a workload estimator tool. The solution profile defines a combination of hardware and software in multiple logical partitions to satisfy the performance objectives. The solution profile may be used by an order processing system to automatically generate an order for a target computer system that includes the desired hardware and software specified in the solution profile. The solution profile may also be used by a hardware management console to automatically create logical partitions on the target computer system. The solution profile may next be used by an operating system install engine to automatically install a desired operating system in each of the logical partitions on the target computer system, and to automatically install desired software into each of the logical partitions in the target computer system. At this point, the solution profile may be used by one or more management tools to manage the target computer system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to the defining, deployment and management of logically-partitioned computer systems. For those not familiar with the concepts of logical partitions, this Overview section will provide background information that will help to understand the present invention.

KNOWN LOGICAL PARTITION SYSTEMS AND TOOLS

Figure 2:
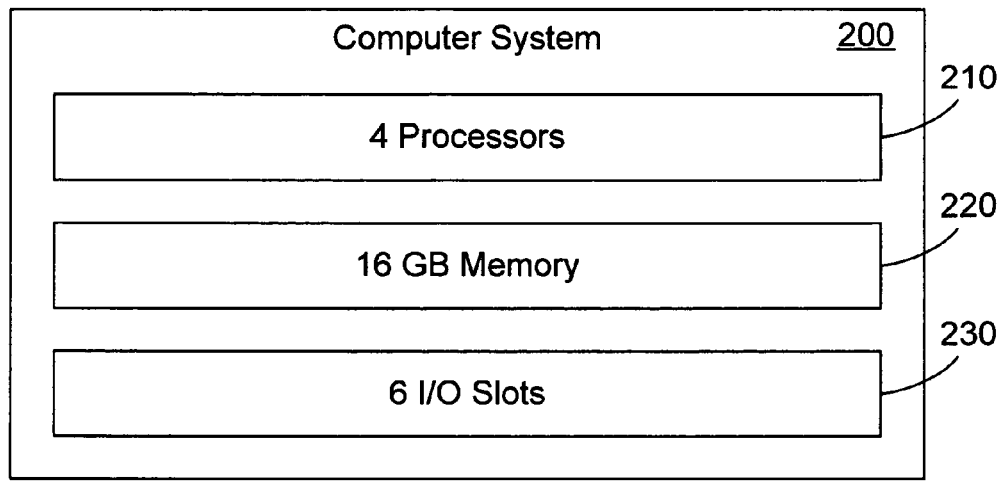
FIG. 2 is a block diagram of a prior art computer system before logical partitioning.
Figure 3:
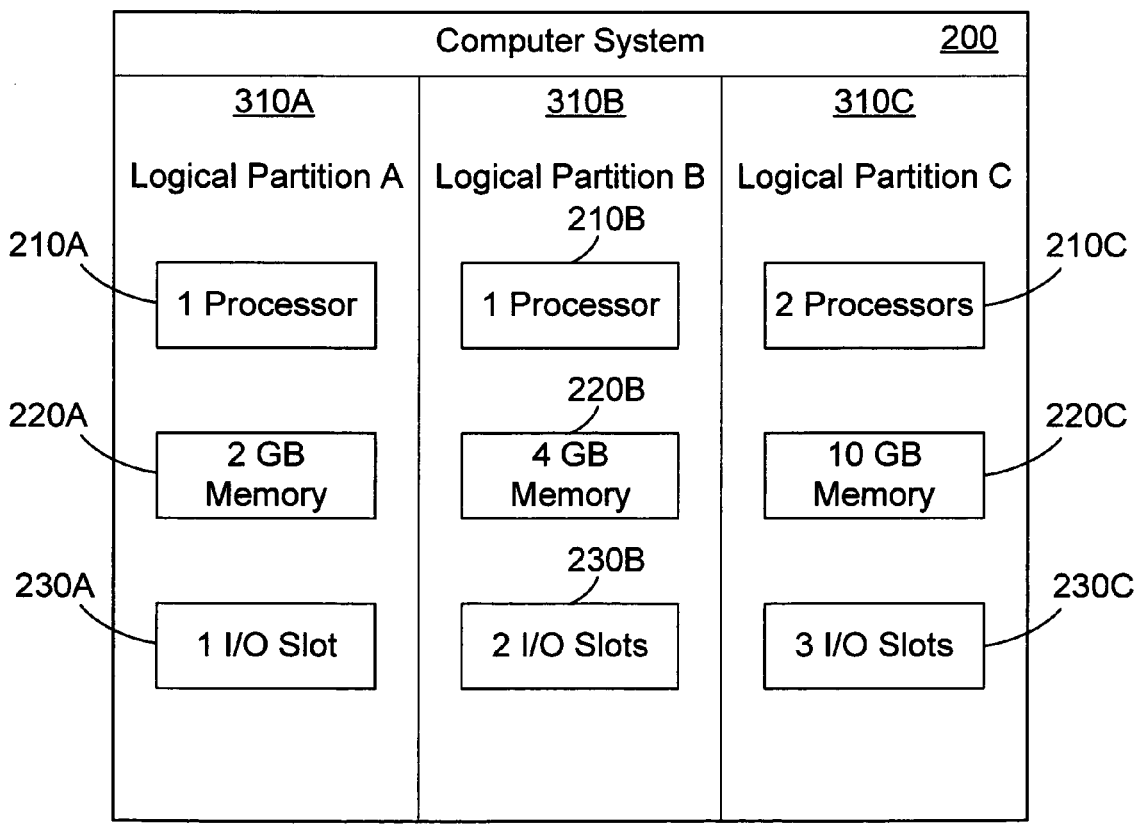
FIG. 3 is a block diagram of the prior art computer system in FIG. 2 after logical partitioning.

As stated in the Background Art section above, a computer system may be logically partitioned to create multiple virtual machines on a single computer platform. Referring to FIG. 2, a sample computer system 200 is shown to include four processors 210, 16 GB of main memory 220, and six I/O slots 230. Note that there may be many other components inside a prior art computer system that are not shown in FIG. 2 for the purpose of simplifying the discussion herein. We now assume that the computer system 200 is configured with three logical partitions, as shown in FIG. 3. The first logical partition 310A is defined to have one processor 210A, 2 GB of memory 220A, and one I/O slot 230A. The second logical partition 310B is defined to have one processor 210B, 4 GB of memory 220B, and 2 I/O slots 230B. The third logical partition 310C is defined to have two processors 210C, 10 GB of memory 220C, and three I/O slots 230C. Note that the total number of processors 210A+210B+210C equals the four processors 210 in the computer system. Likewise for the memory and I/O slots.

Figure 4:
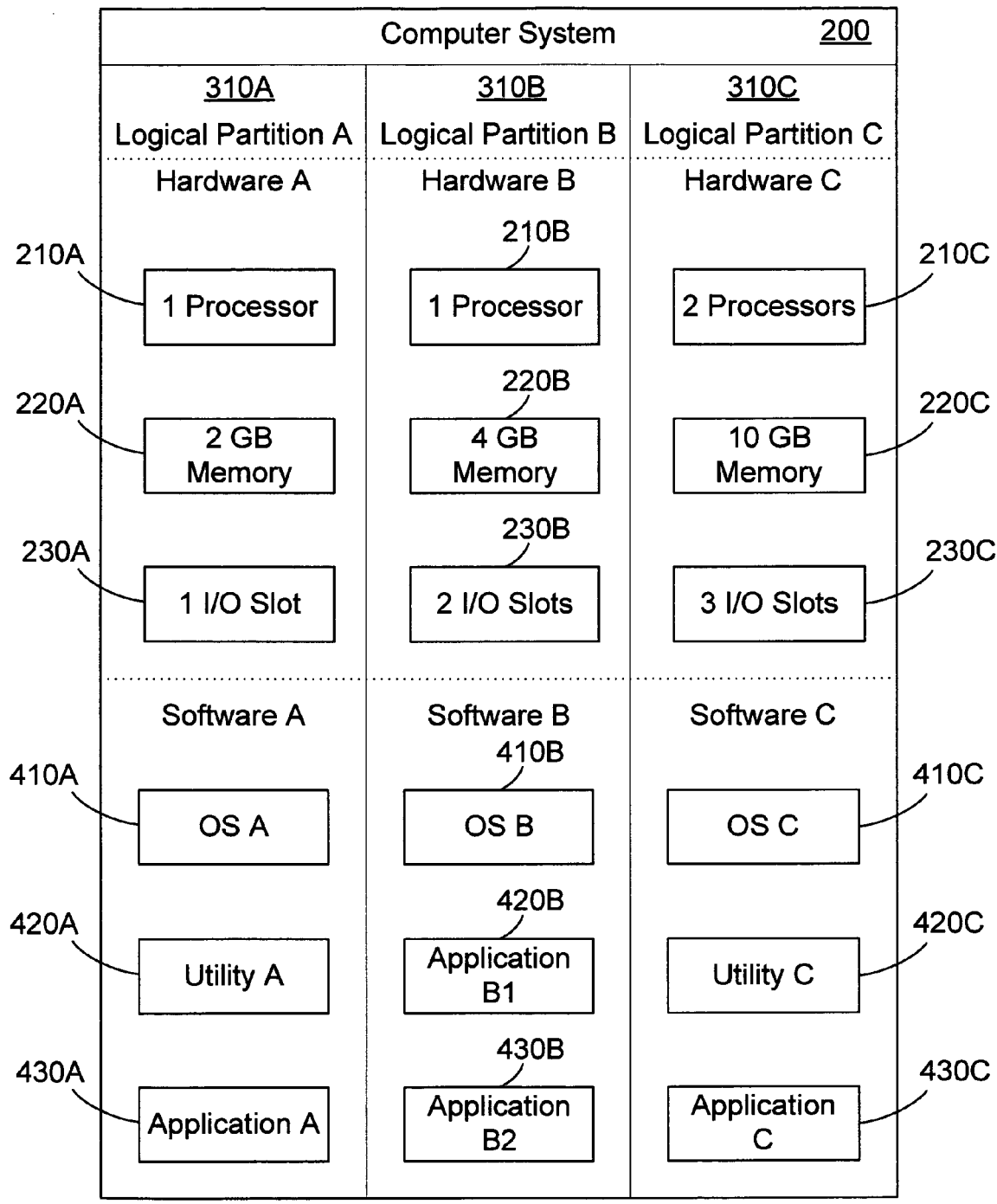
FIG. 4 is a block diagram of the prior art computer system in FIG. 3 after installing an operating system and other software in each logical partition.

Now that hardware resources have been allocated to the logical partitions, software may be installed, as shown in FIG. 4. First, an operating system is typically installed in each partition, followed by utilities or applications as the specific performance needs of each partition require. Thus, for the example in FIG. 4, the first logical partition 310 includes an operating system 410A, a utility 420A, and an application 430A. The second logical partition 310B includes an operating system 410B, and two applications 420B and 430B. The third logical partition 310C includes an operating system 410C, a utility 420C, and an application 430C. Once the software is installed in the logical partitions as shown in FIG. 4, the logically-partitioned computer system is ready for use.

Figure 5:
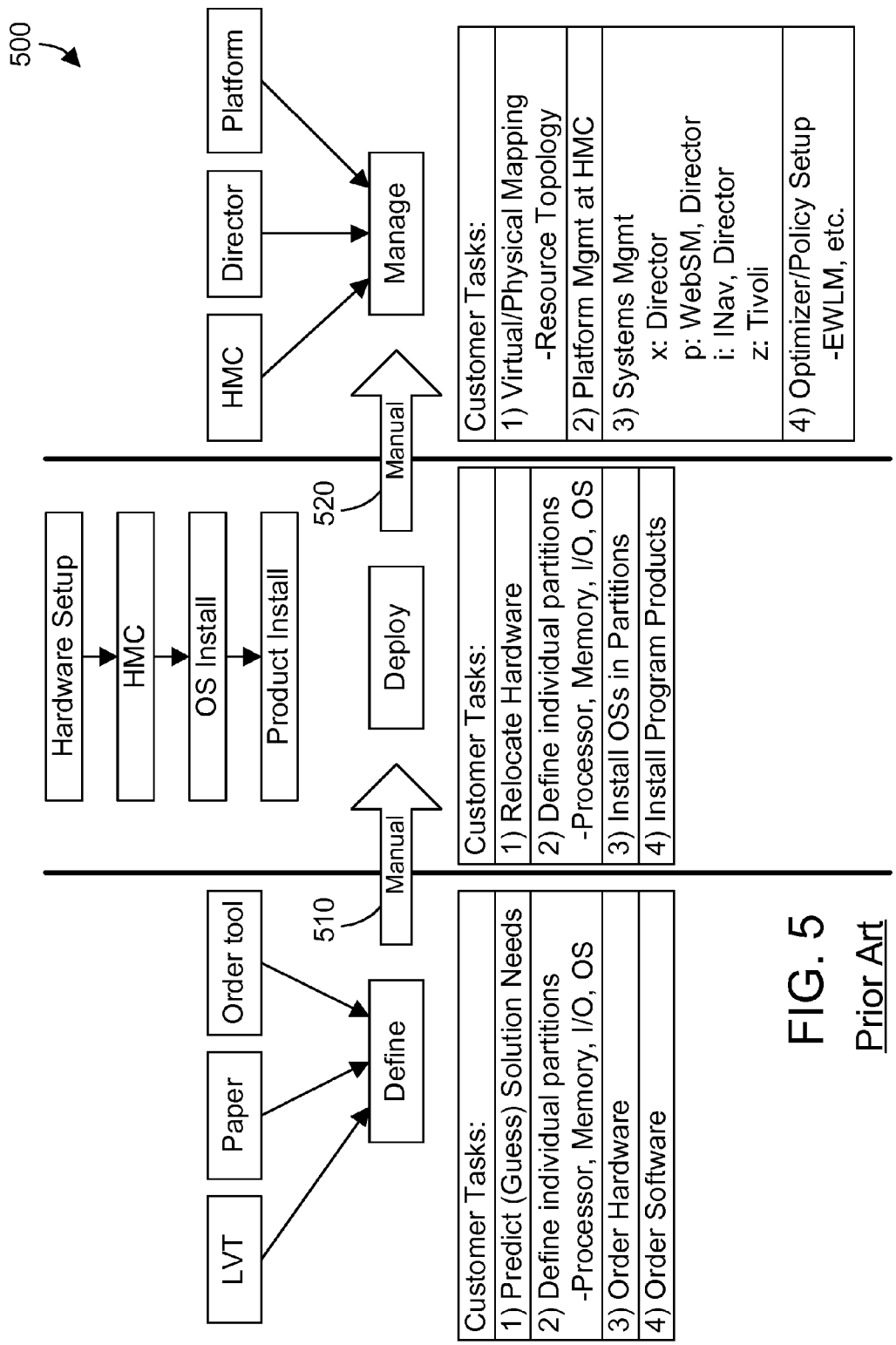
FIG. 5 is a flow diagram of a prior art method for defining, deploying and managing a logically-partitioned computer system.

The known methods for defining, deploying and managing a logically-partitioned computer system are very inefficient, time-consuming, and error-prone. FIG. 5 shows a prior art method 500 for defining, deploying and managing a logically-partitioned computer system, which includes a disjointed set of tools and tasks conducted by the customer. First comes the Define phase, shown on the left side of FIG. 5. A system may be defined in a number of different ways, as shown by the steps listed above the Define box. For example, a logical partition validation tool (LVT) may be used by a customer to plan the needs of a new logically-partitioned computer system. The output of the LVT is a printed plan of the system. An order tool is then used to generate an order. During the generation of the order, the order tool determines if the order can be built, and produces a list of orderable parts so the customer may order the computer system. The steps for a customer to define the system are shown below the Define box in FIG. 5, and include: 1) predicting (or guessing) the solution needs; 2) defining individual partitions; 3) ordering hardware; and 4) ordering software. Once the computer hardware and software are available, the solution may be deployed. Note that the transition from the Define phase to the Deploy phase is a manual step 510 shown in FIG. 5.

The steps in deploying the logically-partitioned computer system are shown above the Deploy box in FIG. 5. The customer tasks are listed below the Deploy box in FIG. 5. First, the hardware of the target computer system must be properly setup. When a computer system is ordered, it will contain all of the required hardware, but not necessarily in the correct slots for a particular system configuration. As a result, the first step a customer must perform is to relocate the hardware to satisfy the customer's desired configuration (customer Deploy task 1). At this point, the target computer system resembles computer system 200 in FIG. 2, just a collection of hardware without any logical partitions or software installed. Once the hardware is relocated to the proper locations, a hardware management console (HMC) may be used to create the logical partitions (customer Deploy task 2). Note that the term hardware management console (HMC) is used herein in a very broad sense to include any system and logical partition management utility that may be used to configure a logically-partitioned computer system. The creation of logical partitions using the HMC includes an assignment of hardware resources to each logical partition, and results in a computer system with assigned hardware resources, as shown in FIG. 3. Once the logical partitions are created, an operating system is installed in each logical partition (customer Deploy task 3). After an operating system is installed in a logical partition, program products (such as utilities and application software) are installed (customer Deploy task 4). Note that wizards may aid in the creation of the logical partitions, installation of the operating system software, and installation of the program products. Once all the software is installed, the logically-partitioned computer system includes multiple logical partitions with their corresponding hardware, operating system, and product software, as shown in FIG. 4.

The process of moving the target computer system from the Deploy stage to the Manage stage is a manual step 520 shown in FIG. 5. There are several tools that may be used to manage the target computer system, as shown above the Manage block in FIG. 5, including a hardware management console (HMC), a Director tool, and a Platform tool. Customer tasks for managing the target computer system include: 1) Virtual/physical mapping, which includes the management of resource topology; 2) platform management at the HMC; 3) systems management; and 4) optimizer/policy setup. Systems management for the xSeries uses a tool known as Director; for the pSeries a tool known as WebSM may be used in addition to Director; for the iSeries a tool known as INav may be used in addition to Director; and for the zSeries a tool known as Tivoli provisioning manager may be used. Director is used to manage x, i and pSeries systems, and provides tools needed to centrally manage all of the hardware in the system, and automates inventory-taking, monitoring and alerting. Tivoli provisioning manager can manage z, x, i and pSeries systems and automates manual tasks of provisioning and configuring servers, operating systems, middleware, applications, storage and network devices. iNav only manages iSeries systems. WebSM is the remote console used for the HMC and other AIX management tools. The optimizer/policy setup tool may use tools such as an electronic workload manager (ELWM) to manage workflow or other tasks.

There are many problems with the prior art system shown in FIG. 5 for defining, deploying and managing a logically-partitioned computer system. First of all, the tools for determining what hardware and software is needed do not effectively produce a solution that will definitely meet the set of system requirements for the system. As a result, there may be some iteration in coming up with a set of hardware and software that is believed will satisfy the performance objectives.

When the target computer system is ordered from the manufacturer, there is no integration between the Define stage and the production of the computer system. As a result, all the hardware for the computer system will be in the computer system, but not necessarily in the right place. As a result, the first step the customer must perform after receiving the target computer system is to relocate hardware to its proper location according to the desired configuration. The customer must then manually create the logical partitions, which requires navigating between a number of different screens to define each logical partition, one at a time. The customer must then install each operating system in each logical partition, which is a very time-consuming process. Next, the customer must install the program products (e.g., utilities, applications and solutions) into their respective operating systems. Each of these steps requires manual action by the customer, which introduces the possibility of human error in configuring the target computer system. In addition, these tasks are very time-consuming, and require substantial technological expertise on the customer's part to be able to configure the target computer system.

Customers are typically interested in solutions, not technology. Most customers would prefer to not spend the time relocating hardware, configuring logical partitions, installing operating systems, and installing program products. The preferred embodiments automate the process of defining, deploying and managing a logically-partitioned computer system to eliminate many of the customer tasks shown in FIG. 5.

2.0 DETAILED DESCRIPTION

A partition wizard within the scope of the preferred embodiments eliminates many of the manual tasks that customers now perform in configuring a logically-partitioned computer system. The partition wizard includes a pre-planning tool that helps the user define a solution profile that will meet a set of system requirements. This solution profile may then be used to place an order for the target computer system, which will result in the hardware being installed at the appropriate locations at the factory. The solution profile may also be used to automatically create the logical partitions on the target computer system, to automatically install the correct operating systems in each logical partition, and to automatically install the program products in the appropriate logical partitions. In addition, the solution profile may be used by one or more management tools to manage the target computer system, such as managing the installation of program temporary fixes (PTFs).

Underlying the present invention is the need to create a way to describe a combination of hardware, logical partitions, and software in a way that may be used to define a target computer system to meet a set of system requirements, to order the target computer system, to automatically deploy the target computer system, and to manage the target computer system. The result is an end-to-end system that automates many of the process steps that are performed manually by customers today.

Figure 1:
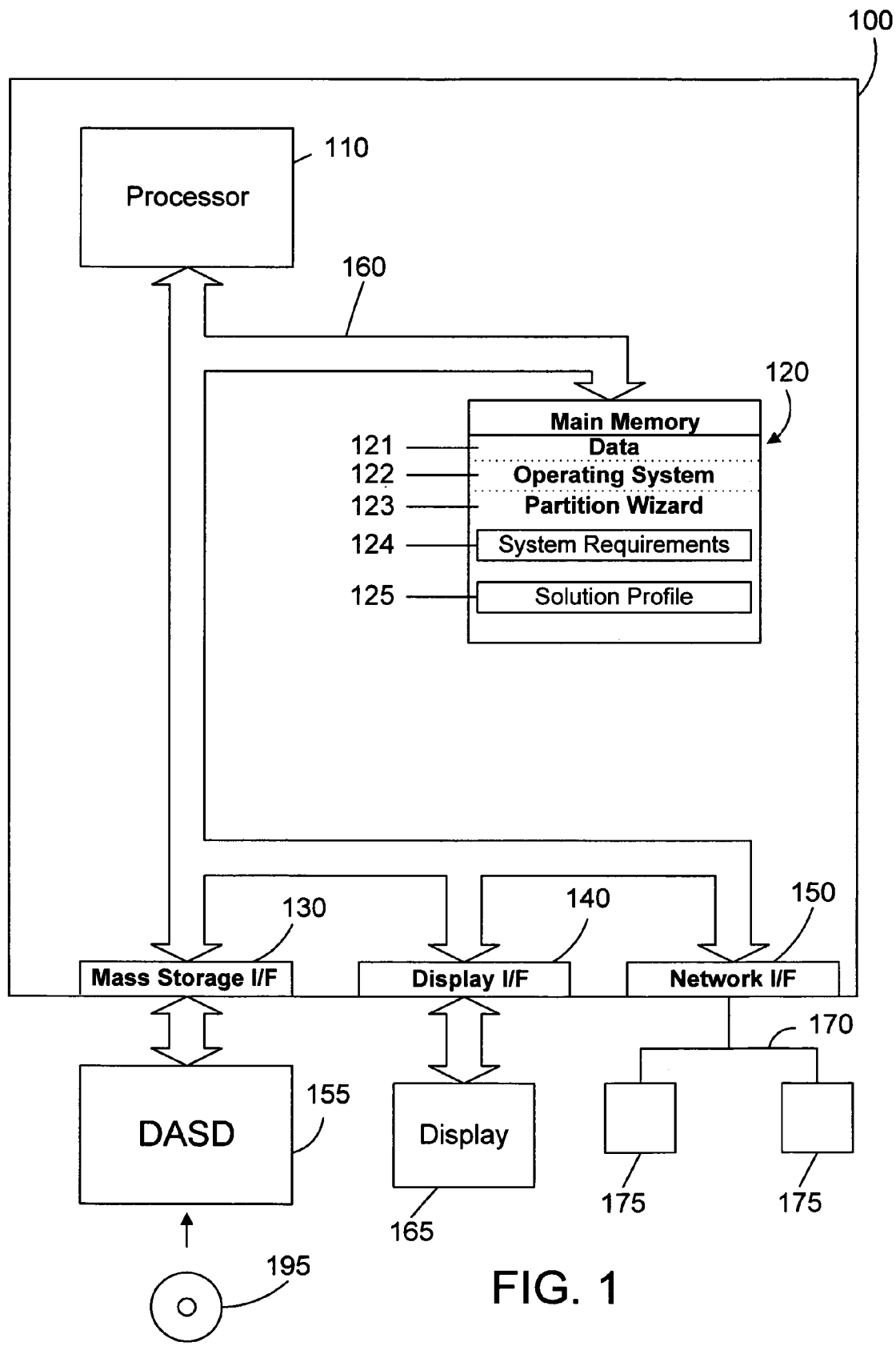
FIG. 1 is a block diagram of a computer apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, and a partition wizard 123. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Partition wizard 123 is an automated tool that takes a set of system requirements 124 and generates therefrom a solution profile 125. The partition wizard 123 includes a pre-planning tool that helps a customer define the set of system requirements 124, thereby automating the process of defining a target logically-partitioned computer system. The solution profile 125 describes hardware, software, virtualization information, performance metrics and any other needed information in a format that may be used to automate the process of ordering, deploying and managing the target logically-partitioned computer system. The function of the partition wizard 123 is described in detail below with reference to FIGS. 6-7.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and partition wizard 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of tangible computer-readable signal bearing media used to actually carry out the distribution. Examples of suitable tangible computer-readable signal bearing media include: recordable type media such as floppy disks and CD-RW (e.g., 195 of FIG. 1), and transmission type media such as digital and analog communications links.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 6:
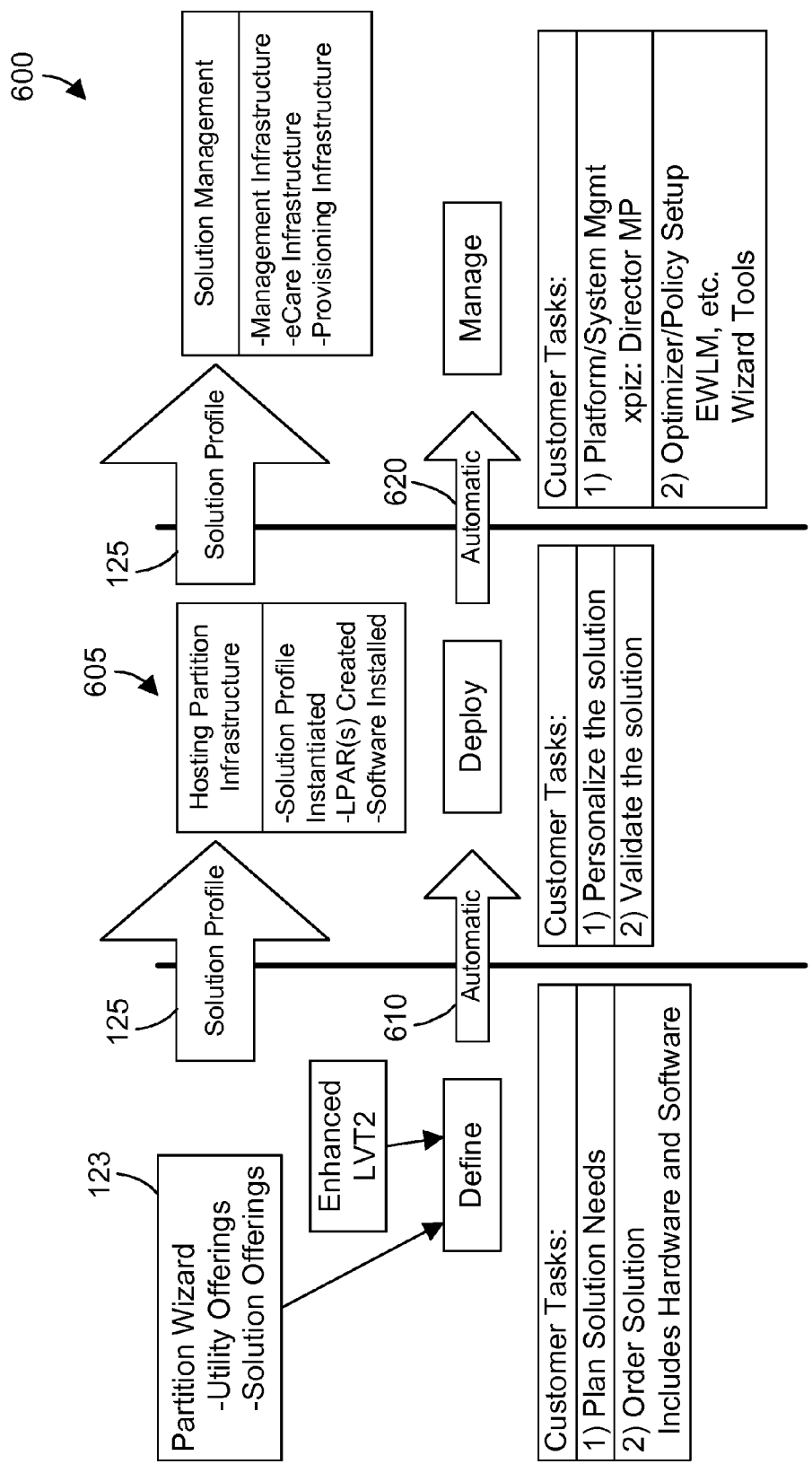
FIG. 6 is a flow diagram of a method in accordance with the preferred embodiments for defining, deploying and managing a logically-partitioned computer system.

FIG. 6 shows one particular method 600 for automatically defining, deploying and managing a logically-partitioned computer system in accordance with the preferred embodiments. This method begins by using the partition wizard 123 to perform planning for a target computer system. This planning begins with a set of system requirements that are then met by a variety of different hardware and software offerings, shown in FIG. 6 as utility offerings and solution offerings. The partition wizard 123 helps to define the set of system requirements for the target computer system, then helps the customer to define an overall solution that includes hardware and software for the target computer system. As a result, the customer tasks in the Define phase in accordance with the preferred embodiments include: 1) planning solution needs; and 2) ordering the solution, which includes hardware and software. The solution is defined not only in terms of hardware and software, but in an overall solution profile 125 that identifies the logical partitions and where the hardware and software resources reside in the logical partitions. One suitable format for the solution profile 125 is extensible Markup Language (XML). Thus, the solution profile 125 may be an XML document that may be used by other tools that need to determine the configuration of the target computer system.

The solution profile 125 may be input into an order processing system (not shown in FIG. 6) to order the target computer system hardware in a way that allows installing the hardware in the correct locations at the factory. The preferred embodiments thus include the ability to input an overall solution profile 125 to an order processing system to eliminate the need for the customer to relocate hardware within the computer system.

A hosting partition infrastructure 605 includes tools that may be used to automatically deploy the solution on a target computer system. The transition from the Define phase to the Deploy phase in FIG. 6 is automatic as shown at 610 due to the creation of the solution profile 125 that may pass the needed information from the Define phase to the Deploy phase. As shown in FIG. 6 above the Deploy box, a solution profile 125 received from the partition wizard 123 is instantiated, corresponding logical partitions are automatically created, and the appropriate operating system and other software is automatically installed in each logical partition. These tasks are completely automated in the preferred embodiment, requiring no action on the part of the customer. As a result, these steps may be performed at the customer site, or may be performed at the factory before shipping the target computer system to the customer.

The solution profile 125 may then be used by one or more tools to manage the target computer system. Note that the transition from the Deploy stage to the Manage stage in FIG. 6 is automatic as shown at 620 due to the solution profile 125. Note that the solution profile 125 passed from the Deploy stage to the Manage stage may be the same that was passed from the Define stage to the Deploy stage. However, the solution profile 125 in the Deploy stage may be modified to include other information that describes the target computer system, such as operating system install scripts and other software install scripts. As a result, it is within the scope of the preferred embodiments to add information to the solution profile 125 during the Deploy phase, then to pass the solution profile 125 that includes the added information to the Manage phase.

As shown in FIG. 6, solution management may include management infrastructure, eCare infrastructure, and provisioning infrastructure. Management infrastructure tools include Director and iNav which are discussed above. eCare infrastructure is a software update/management tool for IBM software. Provisioning infrastructure includes Tivoli provisioning manager, described above. The customer tasks in managing the target computer system include: 1) platform/system management via a Director tool for all four platform types; and 2) optimizer/policy setup, including the setup of tools such as an electronic workload manager (ELWM) and wizard tools for further setting up or optimizing the target computer system.

Figure 7:
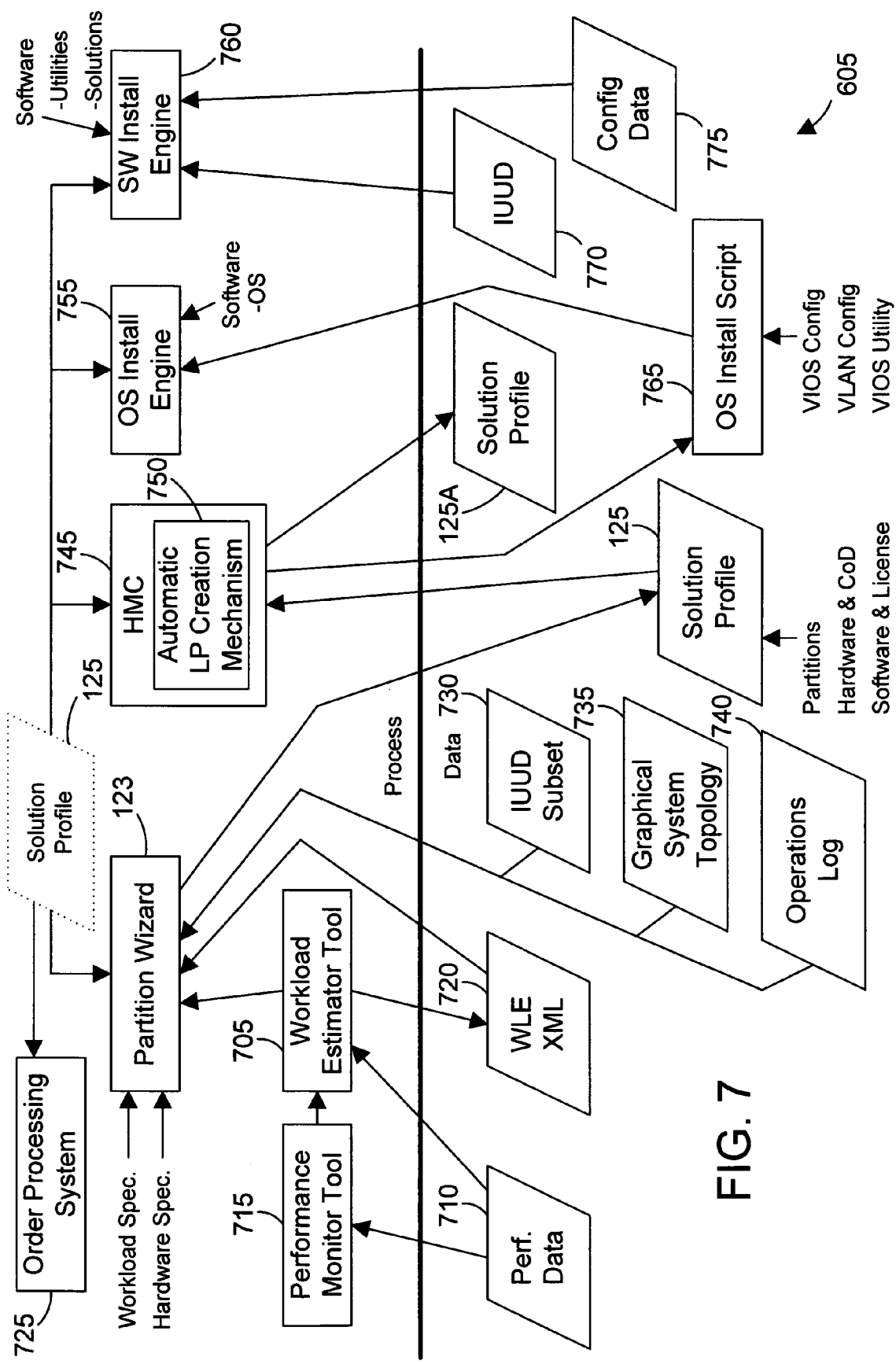
FIG. 7 is a block diagram showing process components and data in one specific implementation that is within the scope of the preferred embodiments.

One implementation of the hosting partition infrastructure 605 in FIG. 6 within the scope of the preferred embodiments is shown in FIG. 7. Note that FIG. 7 is divided by a horizontal line, above which are process blocks and below which are data blocks. The partition wizard 123 is shown.

The partition wizard 123 receives input in the form of a workload specification or hardware specification, or from a workload estimator tool 705. These inputs constitute a set of system requirements for the target computer system. Note the workload estimator tool 705 may receive performance data 710, or may receive data from a performance monitor 715 that uses the performance data 710. The workload estimator tool 705 then generates an XML document 720 that describes the workload estimate. This WLE XML document 720 may be input into the partition wizard 123 as part of the set of system requirements. In addition, the partition wizard 123 may receive Installable Unit Deployment Descriptor (IUDD) subset data 730 that provides a schema that is used to describe the installation of a software package; graphical system topology data 735 that describes the hardware and software topology of the system; and operation log data 740 that describes all actions that were performed plus any message from errors that have occurred. The performance wizard 123 uses all received performance objectives, and generates therefrom a solution profile 125.

As stated above, the solution profile 125 is preferably an XML document. The solution profile 125 is preferably a description of the entire solution on the target computer system, including specified logical partitions that each include specified hardware resources, including Capacity On Demand (CoD capability), a specified operating system, other specified software, and software license information. Because the solution profile 125 includes the details of hardware resource allocation between logical partitions, it may be input into an order processing system 725 to order the hardware for the target computer system in a way that allows the target computer system to be initially assembled at the factory with all of the hardware components in the correct location. This eliminates the need for the customer to relocate hardware once the computer system is received.

Note that the solution profile 125 is shown as a data block in the lower portion of FIG. 7, but is also shown as a dotted box above the partition wizard 123 to indicate that this data may be passed to the order processing system 725, to the HMC 745, to the operating system install engine 755, and to the software install engine 760. It is the passing of the solution profile 125 to these tools that provides the automatic deployment of the target computer system described above with reference to FIG. 6. Once the computer system arrives, it is connected to a hardware management console (HMC) 745, which is preferably a dedicated computer system that is used to configure the target computer system. The HMC 745 preferably includes an automatic logical partition creation mechanism 750 that receives the solution profile 125, and from the description therein automatically creates the required logical partitions on the target computer system. The automatic logical partition creation mechanism 750 also generates an operating system install script 765 that describes how to install each operating system into each logical partition in the target computer system. The operating system install script 765 preferably includes information that specifies the virtual I/O system (VIOS) configuration, the virtual local area network (VLAN) configuration, and may include a utility for setting up the virtual I/O system, as shown below the OS Install Script box 765 in FIG. 7.

Note that the HMC 745 may generate a revised solution profile 125A that may be stored to archive the description of the target computer system, that may be reused by the partition wizard to continue planning the target computer system, or that may be used to replicate the configuration of the target computer system to a different computer system.

The operating system install engine 755 uses the operating system install script 765 to install each operating system in each logical partition according to the specifications in the solution profile 125. Once the operating systems are all installed, the software install engine 760 takes information from the IUDD 770 and from configuration data 775 to determine how to install the utility and product software specified in the solution profile 125. IUDD 770 is preferably a schema that describes the installation of a software utility or application. The config data 775 is any provisioning data that may be needed for operating system install or solution install. Note that the config data 775 shown in FIG. 7 may be provided within the solution profile 125 instead of being provided separately. In addition, the solution profile 125 may capture data from all tools and may include references to IUDDs.

Note that HMC 745 is shown executing the automatic logical partition creation mechanism 750. Note, however, that the partition wizard 123, the operating system install engine 755, and the software engine 760 may also be executed by the HMC 745. In the alternative, any or all of these tools 123, 750, 755 and 760 may be executed on platforms separate from the HMC 745.

Figure 8:
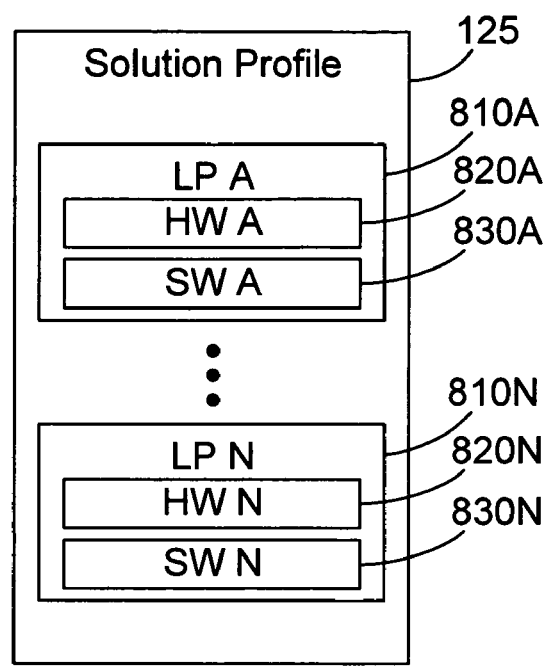
FIG. 8 is a block diagram showing details of the solution profile 125 shown in FIGS. 1, 6 and 7.

FIGS. 8-12 show some examples of how the solution profile 125 may be used as described in FIG. 7. Referring to FIG. 8, the solution profile 125 preferably includes a specification of all logical partitions with their corresponding hardware resources and software resources. Thus, each logical partition 810A, . . . , 810N includes corresponding hardware resources 820A, . . . , 820N and software resources 830A, . . . , 830N. Note that software resources preferably include an operating system and product software (e.g., utility or application software).

Figure 9:
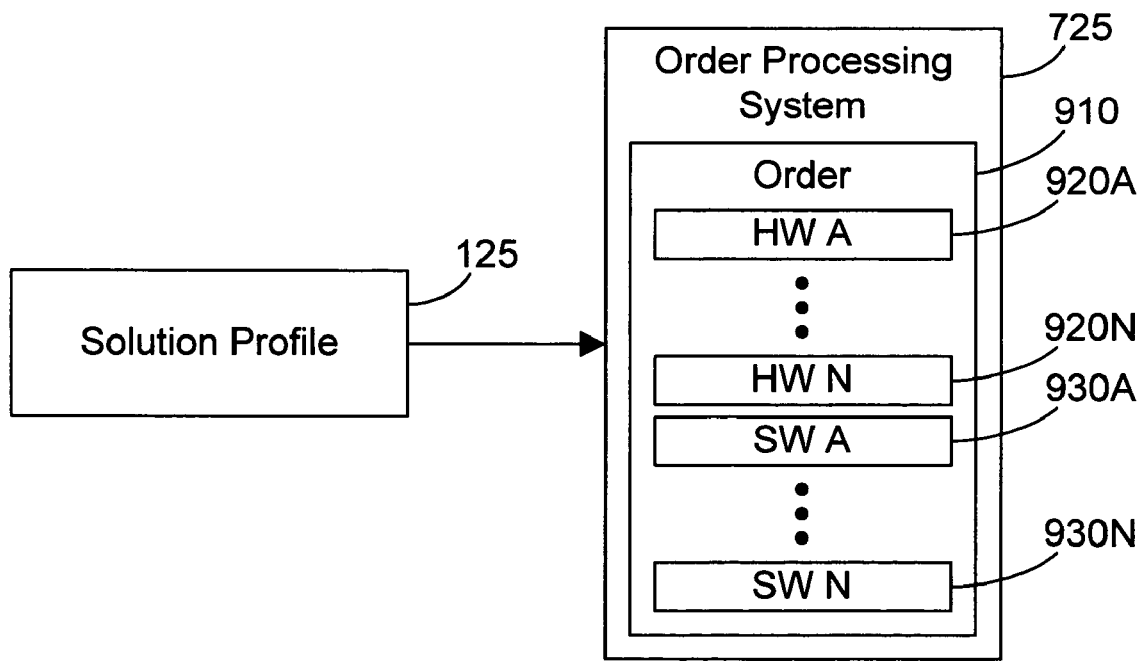
FIG. 9 is a block diagram showing that the solution profile may be used by an order processing system to place an order for hardware and software specified in the solution profile.

FIG. 9 shows how the solution profile 125 may be used by the order processing system 725. We assume for this specific example that the logical partitions will be created by the customer, not at the factory where the target computer system is built. In this case, the order processing system for the factory uses the solution profile 125 to generate an order 910 that specifies all hardware resources 920A, . . . , 920N and all software resources 930A, . . . , 930N. Because the order processing system 725 has knowledge from the solution profile 125 regarding the organization of the hardware and the allocation of hardware resources to different logical partitions, the order processing system 900 can create an order 910 that specifies appropriate locations for the hardware components that will not require relocation by the customer.

Note that the system of FIG. 9 could be modified so that the logical partitions and all suitable hardware and software are installed at the factory instead of by the customer. In this case, an order would be generated that includes the details of the logical partitions and their respective hardware and software resources, as shown in the solution profile 125 in FIG. 8.

Figure 10:
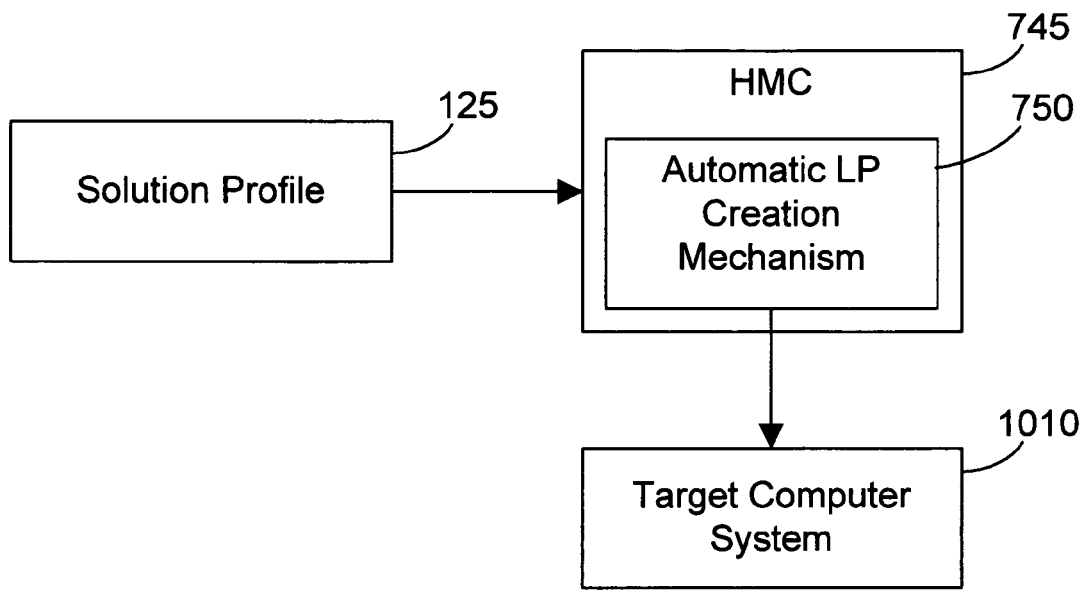
FIG. 10 is a block diagram showing that the solution profile may be used by a hardware management console to automatically create logical partitions on a target computer system as specified in the solution profile.
Figure 11:
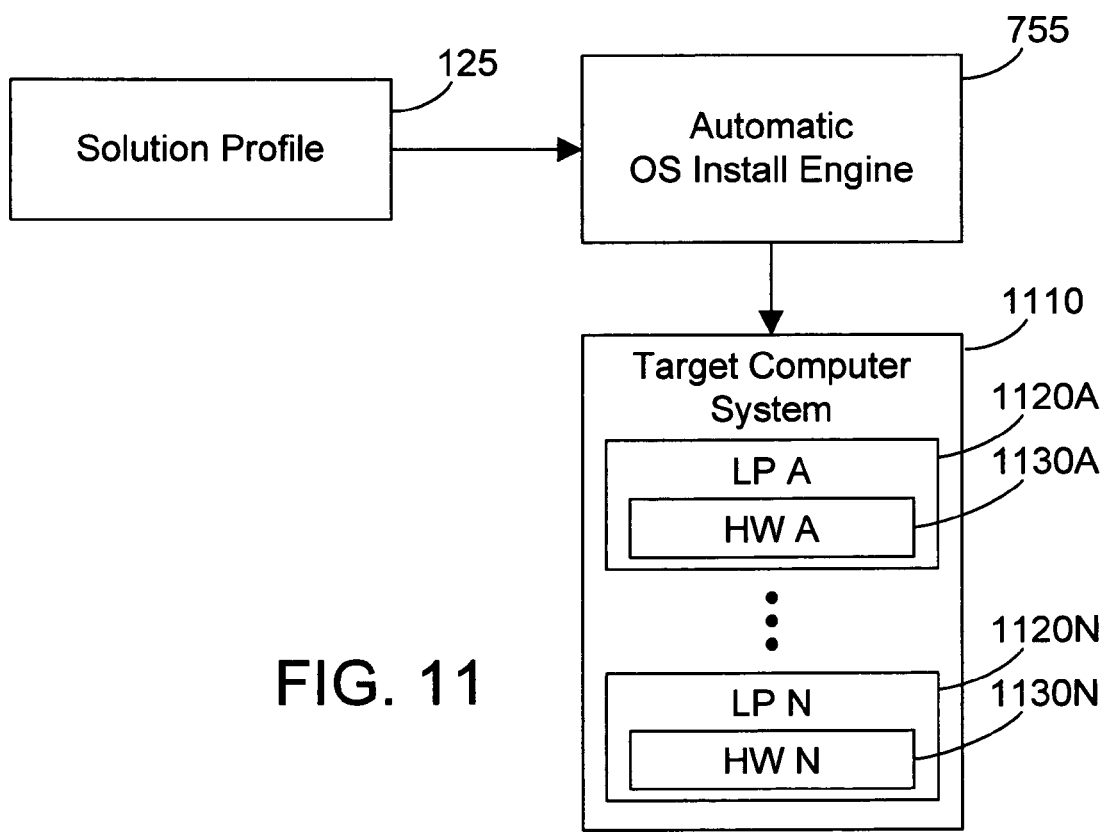
FIG. 11 is a block diagram showing that the solution profile may be used by an automatic operating system install engine to automatically install an operating system in each of the logical partitions as specified in the solution profile.

FIG. 10 shows how the solution profile 125 may be used by the hardware management console 745 to automatically create logical partitions on the target computer system 1010. We assume the target computer system 1010 has all of the required hardware resources installed in the correct locations, as specified in the solution profile 125. At this point, the automatic logical partition creation mechanism 750 automatically creates the logical partitions on the computer system 1010 that are specified in the solution profile 125. This completes the process of defining the logical partitions and allocating the hardware to the logical partitions, resulting in a logically-partitioned target computer system 1110 as shown in FIG. 11. The automating of the creation of logical partitions saves time and reduces the possibility of errors in deploying the target computer system.

FIG. 11 shows how the solution profile 125 may be used by the automatic operating system install engine 755 to automatically install an operating system in each logical partition on the target computer system 1110. Note that the automatic logical partition creation mechanism 750 in FIG. 10 created the logical partitions 1120A, . . . , 1120N in FIG. 11 with their corresponding hardware resources 1130A, . . . , 1130N. At this point, the automatic operating system install engine 755 automatically installs the correct operating system to each logical partition on the target computer system, as specified in the solution profile 125. The automating of the installation of the operating systems into the logical partitions again saves time and reduces the possibility of errors in deploying the target computer system. After the automatic operating system install engine 755 installs an operating system in each logical partition, the computer system is shown at 1210 in FIG. 12.

Figure 12:
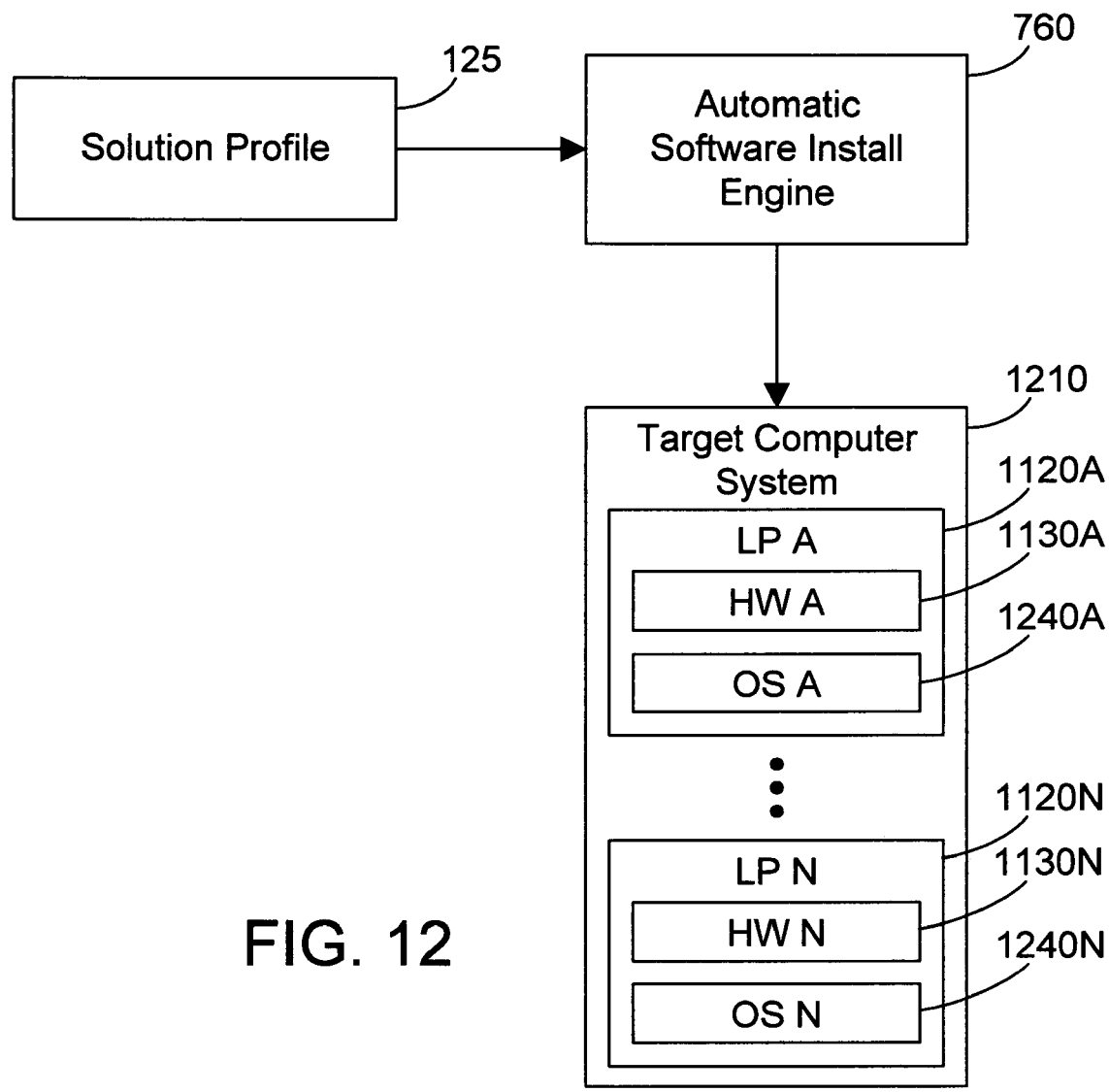
FIG. 12 is a block diagram showing that the solution profile may be used by an automatic software install engine to automatically install utility and application software in each of the logical partitions as specified in the solution profile.

FIG. 12 shows how the solution profile 125 may be used by the automatic software install engine 760 to automatically install software programs in each logical partition on the target computer system 1210. Note that the operating systems 1240A, . . . , 1240N were installed in each logical partition by the automatic operating system install engine 755 shown in FIG. 11. At this point, the automatic software install engine 760 automatically installs the required software to each logical partition on the target computer system, as specified in the solution profile 125. The required software may include any suitable utility or application program. The automating of the installation of the required software into the logical partitions again saves time and reduces the possibility of errors in deploying the target computer system. Once the automatic software install engine 760 is done install all software in all logical partitions, the target computer system will have all logical partitions with their corresponding hardware resources and software resources, as specified in the solution profile 125 shown in FIG. 8.

The management of the target logically-partitioned computer system becomes much simpler with the solution profile 125. For example, in the prior art the customer must determine what hardware and software is present in the system, and must manually determine whether new device drivers or software updates are available. This can be a very complicated and time-consuming process. In the preferred embodiments, however, all required hardware and software information is encapsulated within the solution profile 125 that describes the target computer system. For this reason, a management tool can determine from the solution profile 125 the hardware and software present in the system, and can automatically determine whether new device drivers or software updates are available, without user intervention.

The preferred embodiments automate the defining, deployment and managing of a logically-partitioned computer system by providing a partition wizard that includes a planning tool to help the customer define a system plan that will meet a set of system requirements. The system plan may be used by other tools to 1) automatically create logical partitions; 2) automatically install operating system software in each logical partition; 3) automatically install product software into each logical partition; 4) automatically manage the logically-partitioned computer system; and 5) plan other computer systems.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for creating a target computer system, the method comprising the steps of:
   receiving a set of system requirements;
   processing the set of system requirements, and automatically generating therefrom a solution profile that specifies a combination of hardware and software in a plurality of logical partitions that satisfies the set of system requirements;
   generating from the solution profile an order for the target computer system that includes all hardware and software specified in the solution profile;
   automatically creating on the target computer system the plurality of logical partitions as specified in the solution profile;
   automatically installing an operating system in each of the plurality of logical partitions as specified in the solution profile; and
   automatically installing software in the plurality of logical partitions as specified in the solution profile.

2. The method of claim 1 wherein the set of system requirements is at least partially defined by a workload estimator tool.

3. The method of claim 1 further comprising the step of using the solution profile to manage the target computer system.

4. A computer-implemented method for deploying a target computer system, the method comprising the steps of:
   receiving a solution profile that specifies a combination of hardware and software in a plurality of logical partitions that satisfies a set of system requirements;
   automatically creating the plurality of logical partitions on the target computer system;
   automatically installing an operating system in each of the plurality of logical partitions as specified in the solution profile; and
   automatically installing software in the plurality of logical partitions as specified in the solution profile.

5. The method of claim 4 further comprising the step of using the solution profile to manage the target computer system.

* * * * *